US005238321A

United States Patent [19]
Jarjoura

[11] Patent Number: 5,238,321
[45] Date of Patent: Aug. 24, 1993

[54] MODULAR CONSTRUCTION SYSTEM
[75] Inventor: Michael Jarjoura, Calgary, Canada
[73] Assignee: Uniserve International Products Inc., Alberta, Canada
[21] Appl. No.: 796,413
[22] Filed: Nov. 22, 1991
[30] Foreign Application Priority Data
  Jan. 22, 1991 [CA] Canada ................................. 2034756
[51] Int. Cl.⁵ ............................ F16B 9/00; F16B 7/08; E04H 17/20; E04H 12/22
[52] U.S. Cl. .................................. 403/172; 403/175; 403/178; 403/232.1; 256/65
[58] Field of Search ............... 403/171, 175, 174, 178, 403/232.1, 170, 173; 256/65, 19, DIG. 5

[56] References Cited
U.S. PATENT DOCUMENTS

| | | |
|---|---|---|
| 760,511 | 5/1904 | Alschuler et al. |
| 1,369,837 | 3/1921 | Price. |
| 1,834,642 | 12/1931 | Ragsdale. |
| 3,506,243 | 4/1970 | Seiler ..................................... 256/65 |
| 3,740,084 | 6/1973 | Tellberg. |
| 4,076,431 | 2/1978 | Burvall. |
| 4,200,406 | 4/1980 | Fuss. |
| 4,262,461 | 4/1981 | Johnson et al. |
| 4,357,118 | 11/1982 | Murray. |
| 4,592,671 | 6/1986 | Daum. |
| 4,652,170 | 3/1987 | Lew. |
| 4,673,308 | 6/1987 | Reilly. |
| 4,724,642 | 2/1988 | Hoffman et al. |
| 4,885,883 | 12/1989 | Wright. |
| 5,116,299 | 5/1992 | Kvols ................................... 403/170 |

Primary Examiner—Randolph A. Reese
Assistant Examiner—Christopher J. Novosad
Attorney, Agent, or Firm—Fay, Sharpe, Beall, Fagan, Minnich & McKee

[57] ABSTRACT

A modular construction system for connecting two or more structural members, comprising a universal unit for connection to a first structural member, the unit having at least one planar surface adapted to be oriented in substantially vertical orientation, one or more posts projecting in substantially horizontal orientation from the planar surface, and a pair of finger members defining vertical channels on opposite sides of the one or more posts. One or more connector units are also provided for removable connection to the universal unit, each of the connector units having a planar flange member adapted to be received in the vertical channels and to rest on the one or more posts, and one or more tongue members connected to the flange unit for receiving one or more additional structural members.

22 Claims, 8 Drawing Sheets

MODULAR CONSTRUCTION SYSTEM

FIELD OF THE INVENTION

The present invention relates in general to constructions systems, and more particularly to a novel design of modular units for interconnecting a plurality of structural members.

BACKGROUND OF THE INVENTION

Prior art construction systems are known for connecting vertical structural members (e.g. 4×4 lumber) to one or more horizontal structural members (e.g. 2×4 inch lumber, etc.).

For example, U.S. Pat. No. 760,511 (Alschuler et al), discloses a square collar comprising angle-steel members and cross pieces, in which upper and lower horizontal flanges of the angle-steel members form corner pieces adapted to receive horizontal structural members.

U.S. Pat. No. 4,885,883 (Wright) teaches a unitary construction of rectangular sleeve adapted to receive a vertically aligned piece of lumber as well as horizontal sleeves for receiving horizontal structural members.

U.S. Pat. No. 4,673,308 (Reilly) teaches a corner joint having pivotal support means. The corner joint consists of a block and at least one flange extending from one surface of the block. An aperture is cut through the flange such that when the hinge mechanism is assembled, the flange is inserted into the slot which is formed by a pair of arms until the aperture is aligned with further apertures in the pair of arms. A split pin is then inserted through the three apertures to secure the components together in pivotal relationship.

Accordingly, prior art systems disclose the general concept of a construction unit comprising a generally square sleeve or collar adapted to fit over a vertical structural member, and one or more upper and lower tongues, at least one of which is adapted to pivot, for receiving horizontal structural members.

SUMMARY OF THE INVENTION

According to the present invention, a modular construction system is provided comprising a universal unit adapted for connection to a first structural member, and one or more connector units for removable connection to the universal unit, each connector unit being adapted to receive one or more additional structural members. Therefore, in accordance with one aspect of the present invention, various designs of connector units may be connected to the universal unit, resulting in a modular system.

According to a preferred embodiment of the invention, a pair of posts are provided on the universal unit for engaging and supporting correspondingly dimensioned semi-circular slots or indentations in one or more flange portions of the connector units, by which the tongue portions may be oriented with the flat structural member engaging portions thereof in either vertical or horizontal orientation.

In accordance with a further embodiment of the invention, the flange portion of the connector unit is circular and freely rotatable when resting on the pair of posts projecting from the universal unit.

In general, according to a first aspect of the present invention, there is provided a modular construction system for connecting two or more structural members, comprising:
 a) a universal unit for connection to a first structural member, said unit having at least one planar surface adapted to be oriented in substantially vertical orientation, one or more posts projecting in substantially horizontal orientation from said planar surface, and a pair of finger members defining vertical channels on opposite sides of said one or more posts; and
 b) one or more connector units for removable connection to said universal unit, each of said connector units having a planar flange member adapted to be received in said vertical channels and to rest on said one or more posts, and one or more tongue members connected to said flange unit for receiving one or more additional structural members.

In accordance with a further aspect of the invention, there is provided a modular construction system comprising:
 a) a universal unit having four rectangular planar surfaces forming a generally square sleeve for receiving a vertical structural member;
 b) each of said planar surfaces including a pair of cylindrical posts projecting in substantially horizontal orientation, and a pair of finger members defining vertical channels on opposite sides of said posts;
 c) a connector unit for removable connection to any one of said four surfaces, said connector unit having a planar flange member adapted to be received in said vertical channels and to rest on said posts, and one or more tongue members connected to said flange unit for receiving one or more additional structural members.

BRIEF DESCRIPTION OF THE DRAWINGS

Embodiments of the invention will be described hereinafter with reference to the following drawings, in which.

DETAILED DESCRIPTION OF THE INVENTION

Figure 1:
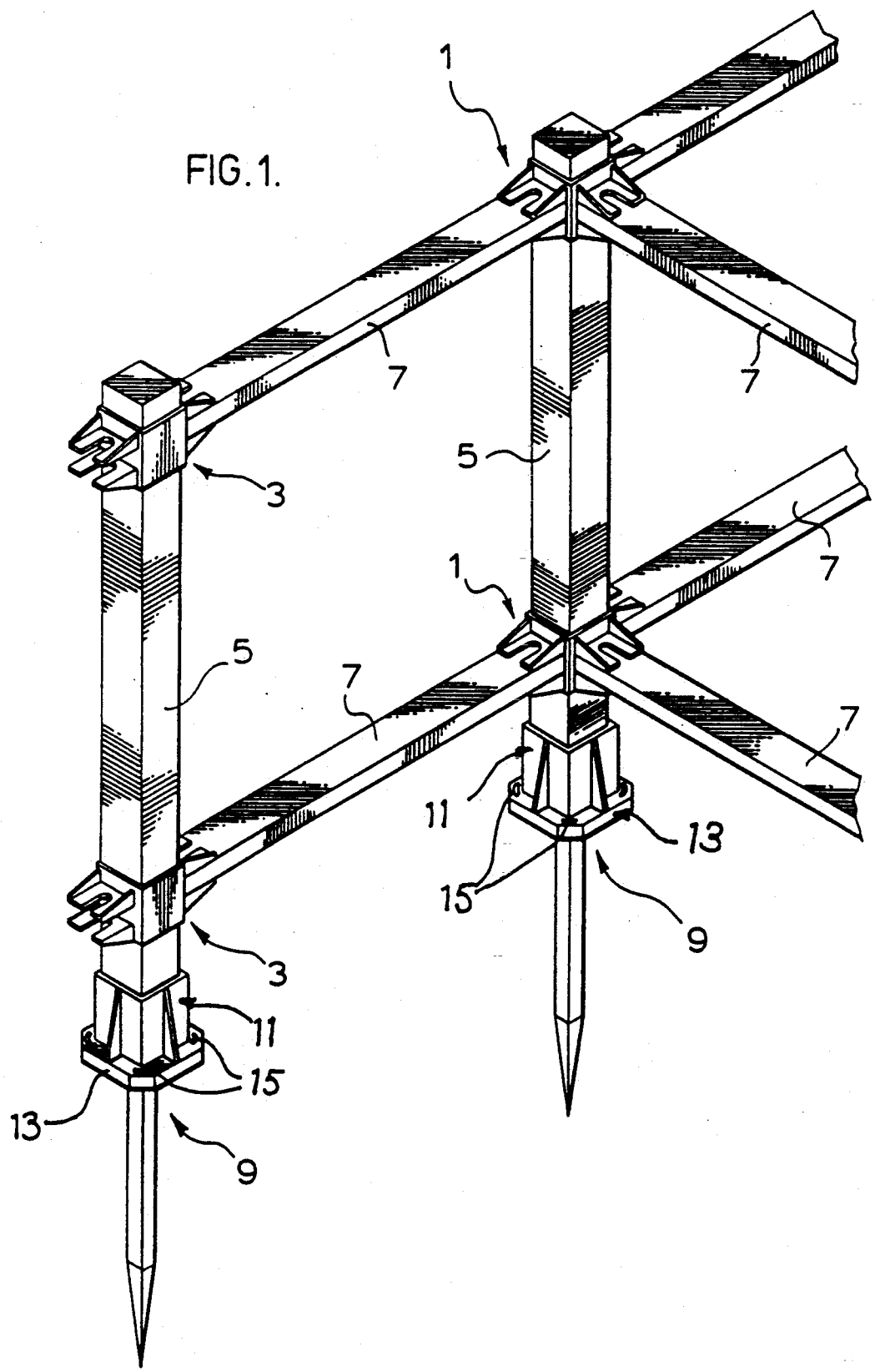
FIG. 1 is perspective view of the modular construction system according to the general principles of the present invention.
Figure 2A:
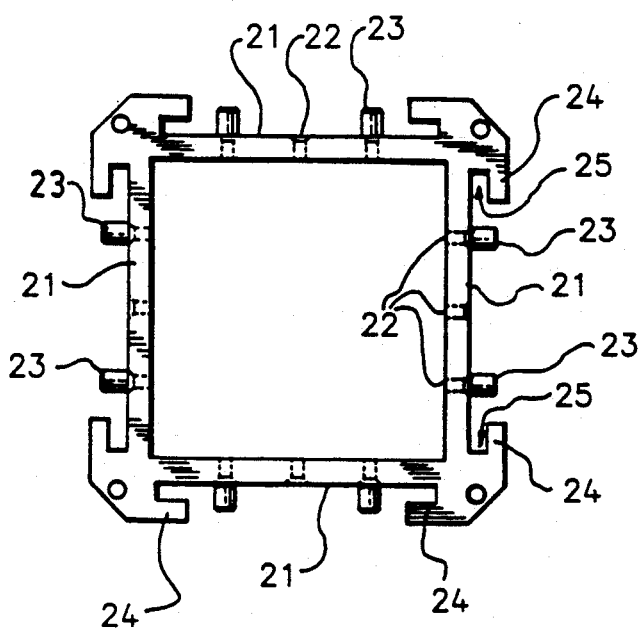
FIGS. 2A, 2B and 2C show a plan view, front view and side view, respectively, of the universal unit shown in FIG. 2.
Figure 2:
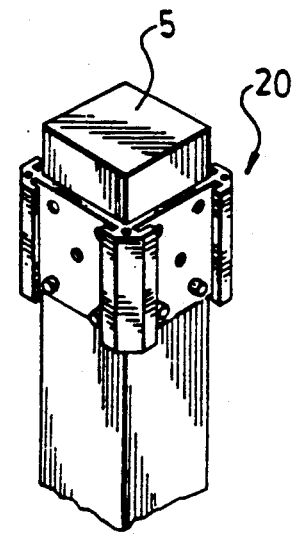
FIG. 2 is a perspective view of a universal unit connected to a vertical structural member, in accordance with the preferred embodiment.
Figure 2B:
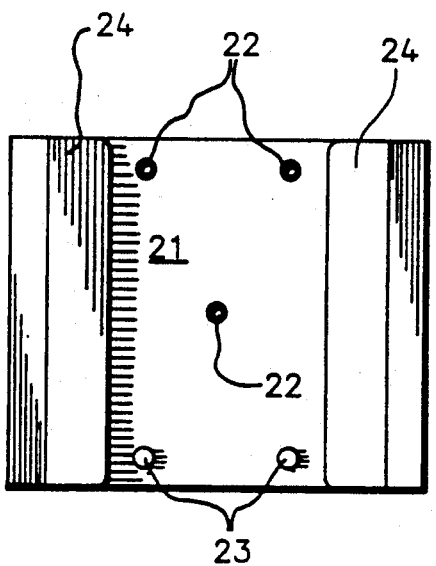
Figure 2C:
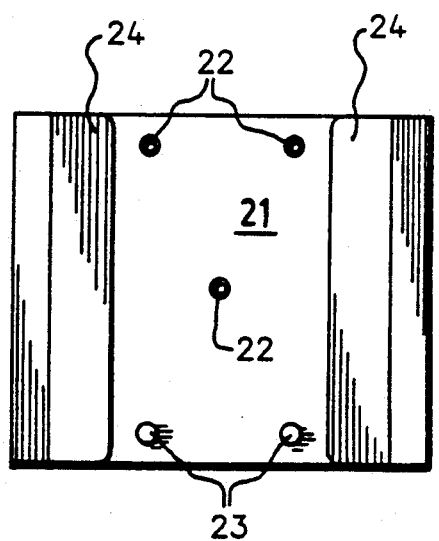

Turning to FIG. 1, a modular construction system is shown according to the present invention in its most general aspect. A plurality of units are provided such as triple unit 1 and standard unit 3 for interconnecting a plurality of vertical structural members 5 and horizontal structural members 7. Each of the units 1 and 3 comprise a sleeve portion and one or more tongue portions as will be described in greater detail below.

Also shown is a combination base unit and spike unit 9 by which the vertical members 5 may be driven into the ground or anchored into concrete, etc. The base unit portion comprises four vertical walls 11 extending from a horizontal base 13, for receiving the structural members 5. The base 13 incorporates a plurality of holes or slots 15 for securing the base to the spike portion, via nuts and bolts or alternatively for securing the base 13 directly via bolts to a concrete slat at ground level or poured concrete beneath the top soil in lieu of the spike portion.

As can be seen from FIG. 1, the construction system set forth may be used to interconnect the structural members 5 and 7 in order to build fences, etc.

With reference to FIGS. 2, 2A-2C, a universal unit 20 is shown for connection to the structural member 5 (i.e. vertical post). The universal unit comprises four planar surfaces 21 forming a rectangular sleeve adapted to surround the structural member 5. In the preferred embodiment, the planar surfaces are 4.125" in height by 5.125" in width. A plurality of holes 22 extend through each planar surface for receiving suitable attachment means (e.g. screw or nail) for attaching the universal unit 20 to the structural member 5. According to the preferred embodiment, each of the holes 22 is a 0.1875 inch diameter counter sunk hole.

A pair of cylindrical posts 23 project orthogonally from each of the planar surfaces 21. According to the preferred embodiment, the posts 23 are 0.25 inch diameter cylindrical posts projecting orthogonally from the planar surfaces 21. In addition, a pair of finger members 24 extend from each of the planar surfaces defining vertical channels 25 on opposite sides of the posts 23. In the preferred embodiment the finger members 24 define a channel 25 having a width of 0.25" between the finger and surface 21, and overhang of 0.375" over the surface 21, and the vertical length of 4.125" (i.e. the vertical dimension of the surface 21).

The fingers 24, channels 25 and posts 23 function to receive and support one or more connector units as discussed in greater detail below with reference to FIGS. 3, 4 and 5.

Figure 3A:
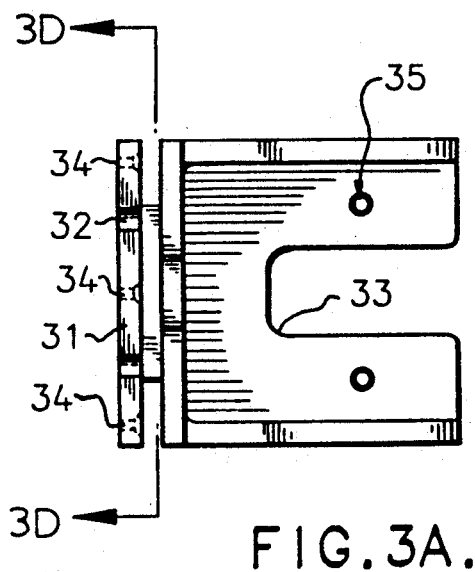
FIGS. 3A, 3B and 3C show a plan view, side view and front view, respectively, of the connector unit shown in FIG. 3.
Figure 3:
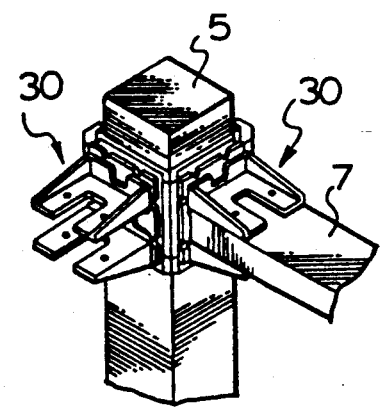
FIG. 3 is a perspective view of a universal unit and two connector units according the preferred embodiment for interconnecting a vertical structural member to one or more horizontal structural members.
Figure 3B:
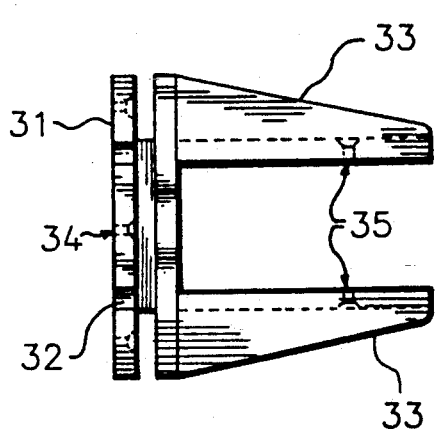
Figure 3C:
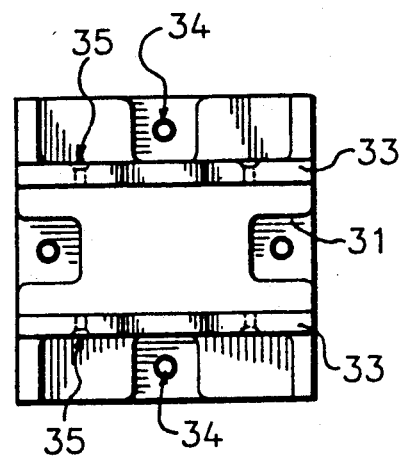
Figure 3D:
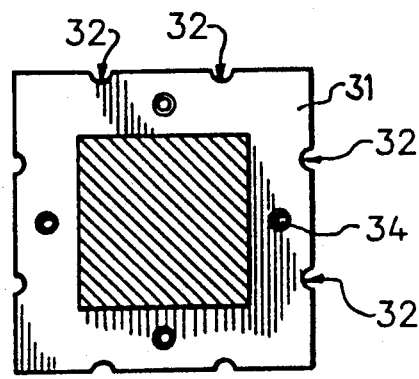
FIG. 3D is a cross sectional view along the line 3D—3D in FIG. 3A.
Figure 4A:
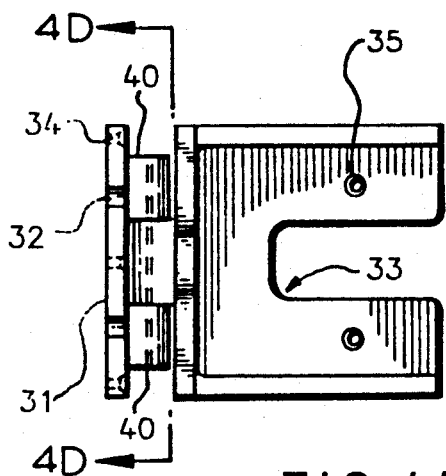
FIGS. 4A, 4B and 4C show a plan view, side view and front view, respectively, of the connector unit of FIG. 4.
Figure 4:
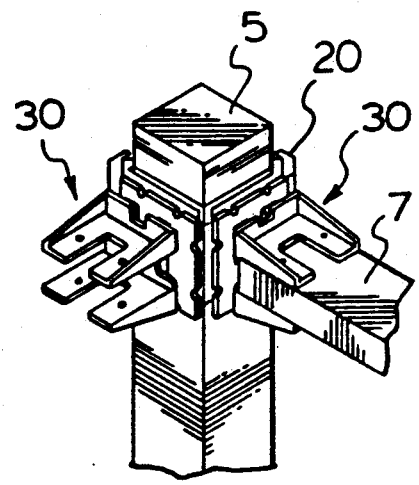
FIG. 4 is a perspective view showing the universal unit and two connector units according to a first alternative embodiment for connecting a vertical structural member to one or more horizontal structural members.
Figure 4B:
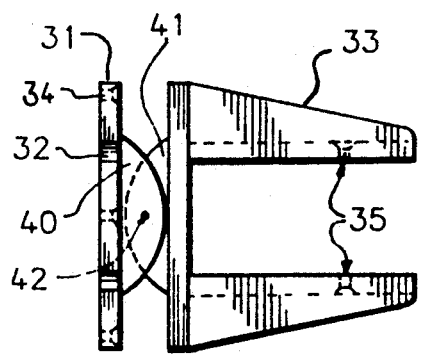
Figure 4C:
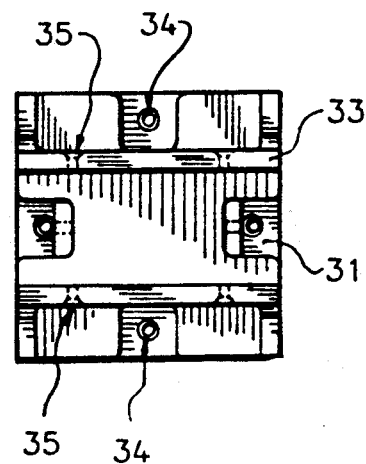
Figure 4D:
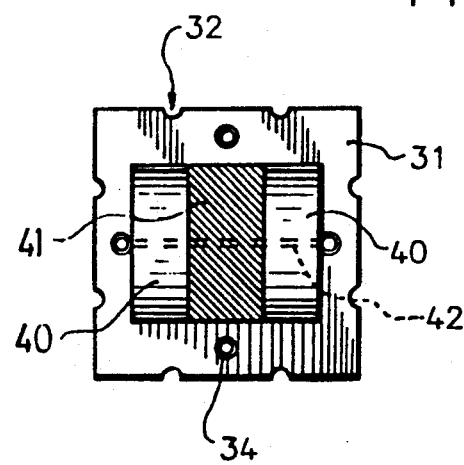
FIG. 4D is a cross sectional view along the lines 4D—4D of FIG. 4A.

Turning now to FIG. 3, a pair of connector units 30 are shown received within the universal unit 20 in order to connect structural members 5 and 7.

The connector units 30 are shown in greater detail with reference to FIGS. 3A-3D. In particular, each connector unit comprises a flange member 31 having dimensions of 3.375"×3.375" and a thickness of 0.25", adapted to be received in the vertical channels 25 of the universal unit 20 and to rest on the posts 23. Specifically, as shown best in FIG. 3D, each side of the rectangular flange member 31 includes a pair of semi-circular notches or indentations 32 of 0.125" radius adapted to receive the posts 23 when resting thereon.

The connector unit 30 also includes a pair of tongue members 33 for receiving the structural members 7. In the preferred embodiment, the tongue members extend 3.25" from the flange member 31, and each tongue comprises a U-shaped configuration where each arm is separated by 1".

A plurality of holes 34 are provided in the flange member 31 for receiving suitable fastening means (e.g. screws or nails etc.) by the which the connector unit 30 may be fastened to the universal unit 20 when received within the channels 25 and resting on posts 23. In the preferred embodiment the holes 34 are 0.125" diameter countersunk holes.

Each of the tongue members 33 also include a pair of holes 35 for receiving fastening means by which the tongue members may be fastened to the structural members 7. In the preferred embodiment, the holes 35 are also 0.125" diameter countersunk holes.

A first alternative embodiment of the connector unit 30 is shown in relation to FIGS. 4, 4A-4D. Like reference numerals are used to denote identical features to the preferred embodiment of FIG. 3. However, in addition to the common features, the embodiment of FIG. 4 includes a hinged or pivot mechanism comprising a first pair of rounded protrusions 40 extending from flange member 31, a further rounded protrusion 41 extending from the tongue member 33, each of the protrusions 40 and 41 having a hole extending therethrough for receiving a steel hinge pin 42 when the holes are aligned as shown best with reference to FIGS. 4A, 4B and 4D.

In a successful prototype of this embodiment, each of the protrusions 40 and 41 are in the form of a segment of a circle having 1.125" radius, and the hinge pin 42 is a 0.1875" pin.

FIGS. 5, 5A-5D illustrate a second alternative embodiment of connector 30 in which the flange member 31 is circular such that the flange member can be rotated about a horizontal axis when received within the vertical channels 25 and resting on the posts 23. The embodiment of FIG. 5 also incorporates the hinge or pivot mechanism discussed in the first alternative embodiment shown in FIG. 4. In a successful prototype of this embodiment, the circular flange member 31 has a diameter of 3.375", with four spaced apart holes for securing the flange to the universal unit. Also, the protrusions 40 and 41 in this embodiment are semi-circular segments having 0.875" radius.

Figure 5A:
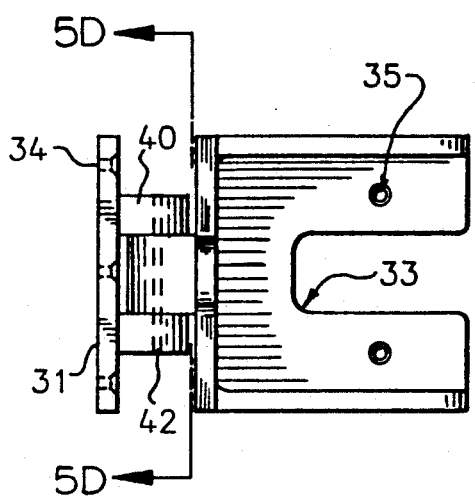
FIGS. 5A, 5B and 5C show a plan view, side view and front view, respectively, of the connector unit illustrated in FIG. 5.
Figure 5:
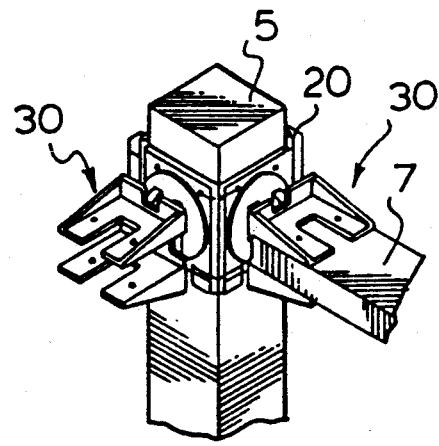
FIG. 5 is a perspective view of the universal unit and a pair of connector units according to a second alternative embodiment of the invention, for connecting a vertical structural member to one or more horizontal structural members.
Figure 5B:
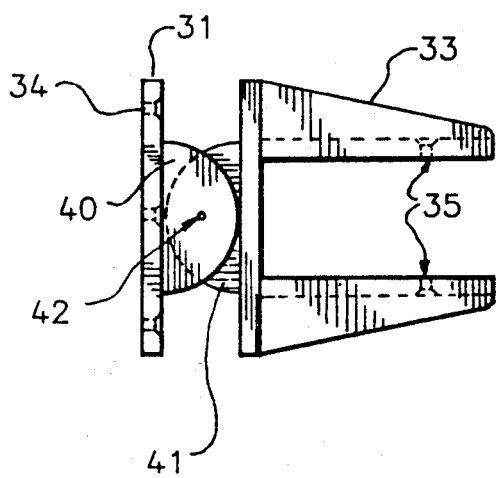
Figure 5C:
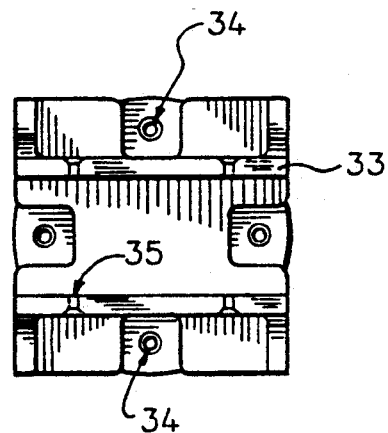
Figure 5D:
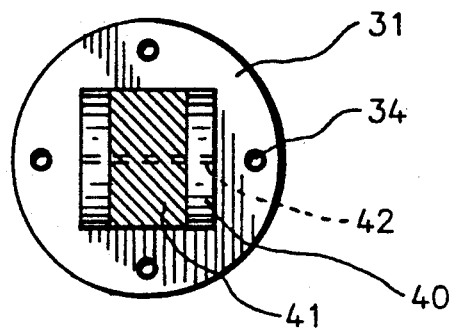
FIG. 5D is a cross sectional view along the lines 5D—5D of FIG. 5A.

Of course, in the embodiment of FIG. 5, no notches are provided in the flange member since the intention of this embodiments is to allow for rotation of the flange member within the universal unit 20.

Figure 6A:
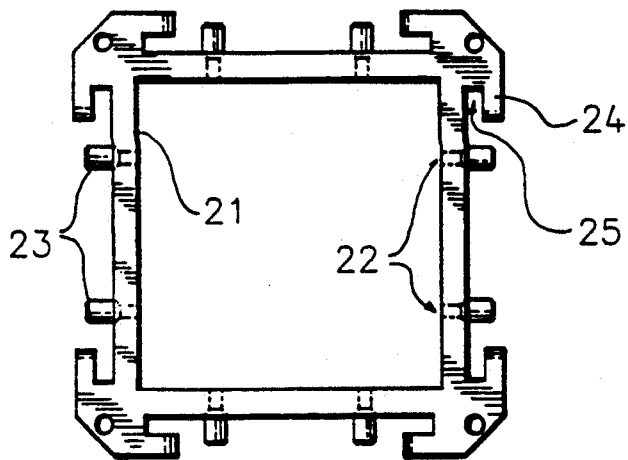
FIGS. 6A, 6B and 6C show a plan view, side view and front view, respectively, of the universal unit of FIG. 6.
Figure 6:
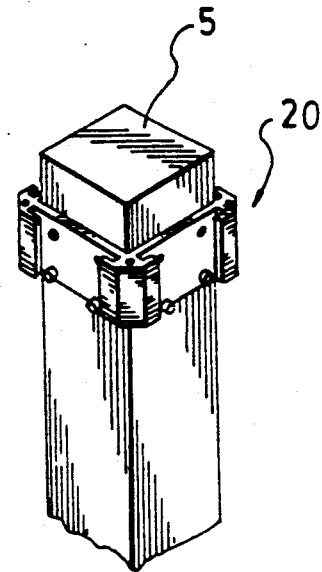
FIG. 6 is a perspective view of a universal unit according to a third alternative embodiment of the invention.
Figure 6B:
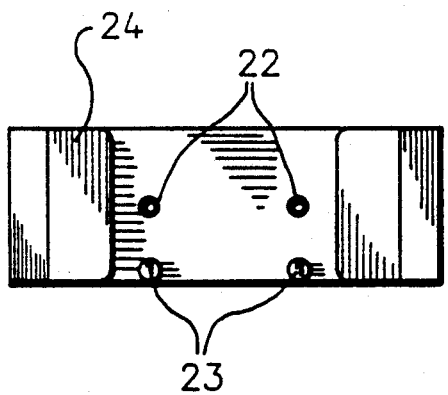
Figure 6C:
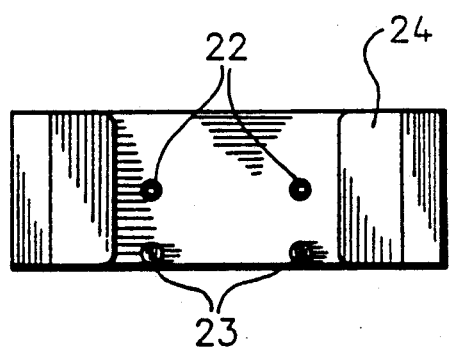

Turning to FIGS. 6, 6A-6C, a third alternative embodiment is shown in which the universal unit 20 is of reduced dimensions (i.e. a height of 1.75" instead of 4.125" as in the preferred embodiment), and in which one of the holes 22 has been eliminated from each of the planar surfaces 21. However, in all other respects, the universal unit of FIG. 6 is identical in function to the preferred embodiment of FIG. 2.

Figure 7A:
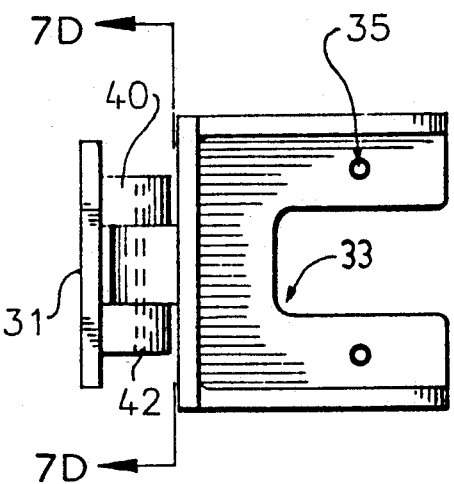
FIG. 7A, 7B and 7C show a plan view, side view and front view, respectively, of the connector unit shown in FIG. 7.
Figure 7:
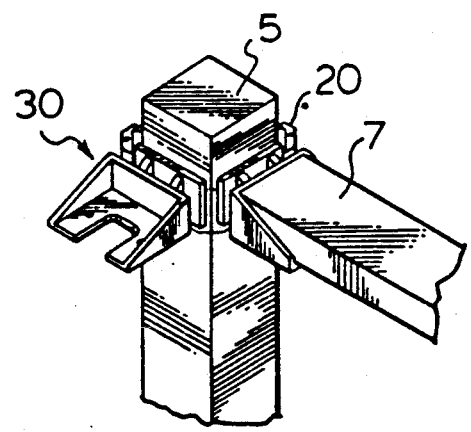
FIG. 7 shows the universal unit of FIG. 6 and a pair of connector units in accordance with a fourth alternative embodiment, for connecting a vertical structural member to one or more horizontal structural members.
Figure 7B:
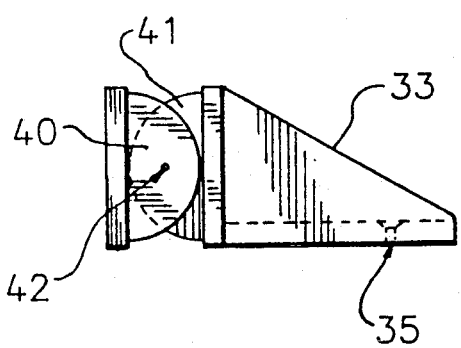
Figure 7C:
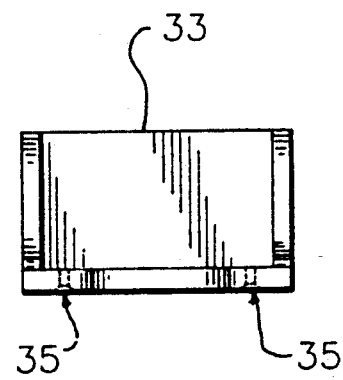
Figure 7D:
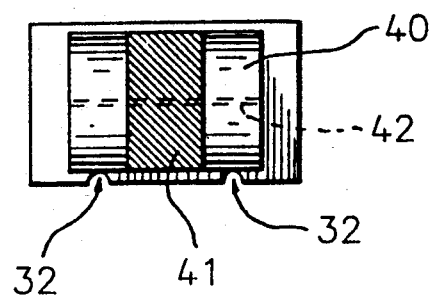
FIG. 7D is a cross sectional view along the lines 7D—7D in FIG. 7A.
Figure 8A:
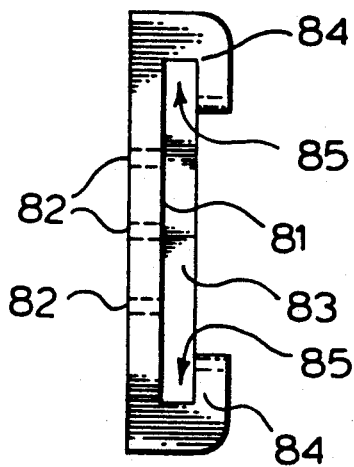
FIGS. 8A, 8B and 8C show a plan view, side view and front view, respectively, of the jawmount unit.
Figure 8:
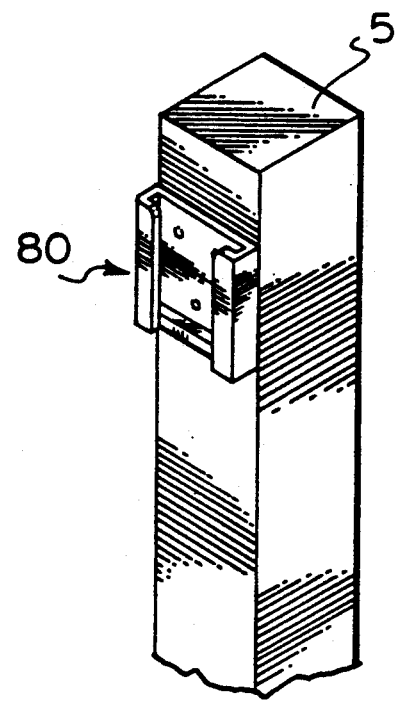
FIG. 8 is a perspective view showing a jawmount unit as an alternative to the universal unit of FIG. 2.
Figure 8B:
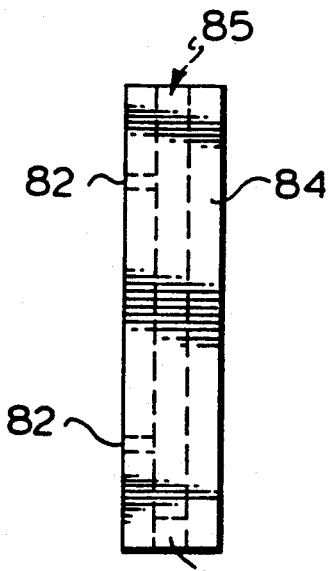
Figure 8C:
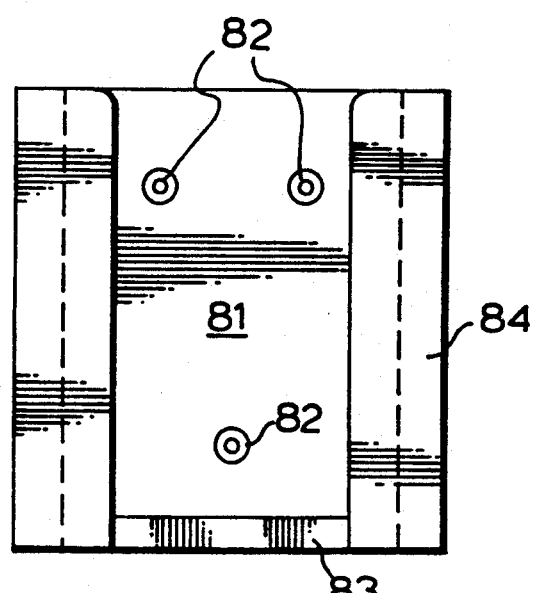

With reference to FIGS. 7, 7A-7D, a further alternative embodiment of connector unit 30 is shown for use with the alternative universal unit 20 depicted in FIG. 6. The connector unit 30 of FIG. 7 is similar to the connector shown with reference to FIG. 4 with the exception that only one tongue member 33 is provided and no fastening holes 34 are provided in the flange member 31.

Turning finally to FIGS. 8, 8A-8C, a jawmount unit 80 is shown for connection to structural member 5 as an alternative to the universal unit 20. Thus, where the term "universal joint" is used, this term is meant to include the jawmount unit as an alternative embodiment. The jawmount unit 80 comprises a single planar surface 81 adapted to be attached to the structural member 5 via screws or nails through holes 82. As an alternative to the posts 23 in the universal unit 20, the jawmount unit 80 is provided with a horizontal ledge 83 for receiving and supporting the various connector units. Furthermore, finger members 84 are provided in a similar manner as the finger members of the universal unit for defining channels 85.

In summary, according to the present invention, a modular construction system is provided comprising a universal unit adapted to receive any one of a plurality of connector units for interconnecting vertical and horizontal structural members, such as lumber, in the construction of fences or other structures.

Other embodiments and modifications of the invention are possible.

For example, although this specification describes the universal unit as being connectable to a vertical structure member such that the channels 25 are in vertical orientation, posts 23 project in horizontal orientation and tongue members 3 of the connector units are connectable to horizontal structural members, the universal unit can be connected to a horizontal or other orientation of structural member resulting in consequent reorientation of the channels 25, posts 23 and tongue members 33 of the connector units.

Furthermore, the specific dimensions referred to herein are for illustrative purposes only. Other suitable dimensions of components may be utilized which carry out the principles of this invention.

In addition, depending on the type of material used to produce the modular units (e.g. plastic, steel, etc.), the modular system of the present invention may be used to join structural members together to construct, in addition to fences, such structures as mezzanine floors for warehouses and offices, garages, sheds, playground facilities, commercial shelving, etc.

All such embodiments or modifications are believed to be within the scope of the claims appended hereto.

I claim:

1. A modular construction system comprising:
   a) a universal unit having four rectangular planar surfaces forming a generally square sleeve for receiving a vertical structural member;
   b) each of said planar surfaces including a pair of cylindrical posts projecting in substantially horizontal orientation, and a pair of finger members defining vertical channels on opposite sides of said posts;
   c) a connector unit for removable connection to any one of said four surfaces, said connector unit having a planar flange member adapted to be received in said vertical channels and to rest on said posts, and one or more tongue members connected to said flange unit for receiving one or more additional structural members.

2. The modular construction system of claim 1, wherein said planar flange member is rectangular and is provided with a pair of semi-circular notches on each side thereof adapted to receive said posts when resting thereon, whereby said one or more tongue members may be connected to said universal unit in one of four orientations.

3. The modular construction system of claim 2, further comprising pivot means connecting said tongue members to said flange member, whereby said tongue members may be oriented at different angles relative to said flange member.

4. The modular construction system of claim 1, wherein said planar flange member is circular such that said flange member is rotatable about a horizontal axis when received within said vertical channels and resting on said posts.

5. The modular construction system of claim 4, further comprising pivot means connecting said tongue members to said flange member, whereby said tongue members may be oriented at different angles relative to said flange member.

6. The modular construction system of claim 1, further comprising a plurality of holes in each said four planar surfaces for receiving fastening means by which said universal unit may be fastened to said vertical structural unit.

7. The modular construction system of claim 1, further comprising a plurality of holes in said flange member for receiving fastening means by which said connector unit may be fastened to said one of said four planar surfaces.

8. The modular construction system of claim 1, further comprising a plurality of holes in said one or more tongue members for receiving fastening means by which said tongue members may be fastened to said one or more additional structural members.

9. A modular construction system for connecting two or more structural members, comprising:
   a) a universal unit for connection to a first structural member, said unit having at least one planar surface adapted to be oriented in substantially vertical orientation, support means projecting in substantially horizontal orientation from said planar surface, and a pair of finger members defining vertical channels on opposite sides of said support means;

b) one or more connector units for removable connection to said universal unit, each of said connector units having a planar flange member adapted to be received in said vertical channels and to rest on said support means, and one or more tongue members connected to said flange unit for receiving one or more additional structural members; and c) wherein said support means comprise a horizontal ledge.

10. The modular construction system of claim 9, further including:
   a first structural member operatively connected to the universal unit; and
   a base unit comprising four vertical walls extending from a horizontal base, for receiving said first structural member, said base unit including a plurality of holes for anchoring said base unit via suitable attachment means.

11. A modular construction system for connecting two or more structural members, comprising:
   a) a universal unit for connection to a first structural member, said unit having at least one planar surface adapted to be oriented in substantially vertical orientation, support means projecting in substantially horizontal orientation from said planar surface, and a pair of finger members defining vertical channels on opposite sides of said support means;
   b) one or more connector units for removable connection to said universal unit, each of said connector units having a planar flange member adapted to be received in said vertical channels and to rest on said support means, and one or more tongue members connected to said flange unit for receiving one or more additional structural members; and
   c) wherein said support means comprises one or more cylindrical posts, and said planar flange member is rectangular and is provided with one or more notches on one or more sides thereof adapted to receive said one or more posts when resting thereon.

12. The modular construction system of claim 11, further including:
   a first structural member operatively connected to the universal unit; and
   a base unit comprising four vertical walls extending from a horizontal base, for receiving said first structural member, said base unit including a plurality of holes for anchoring said base unit via suitable attachment means.

13. A modular construction system for connecting two or more structural members, comprising:
   a) a universal unit for connection to a first structural member, said unit having at least one planar surface adapted to be oriented in substantially vertical orientation, support means projecting in substantially horizontal orientation from said planar surface, and a pair of finger members defining vertical channels on opposite sides of said support means;
   b) one or more connector units for removable connection to said universal unit, each of said connector units having a planar flange member adapted to be received in said vertical channels and to rest on said support means, and one or more tongue members connected to said flange unit for receiving one or more additional structural members
   c) wherein said planar flange member is circular such that said flange member is rotatable about a horizontal axis when received within said vertical channels and resting on said support means.

14. The modular construction system of claim 13, further including:
   a first structural member operatively connected to the universal unit; and
   a base unit comprising four vertical walls extending from a horizontal base, for receiving said first structural member, said base unit including a plurality of holes for anchoring said base unit via suitable attachment means.

15. A modular construction system for connecting two or more structural members, comprising:
   a) a universal unit for connection to a first structural member, said unit having at least one planar surface adapted to be oriented in substantially vertical orientation, support means projecting in substantially horizontal orientation from said planar surface, and a pair of finger members defining vertical channels on opposite sides of said support means;
   b) one or more connector units for removable connection to said universal unit, each of said connector units having a planar flange member adapted to be received in said vertical channels and to rest on said support means, and one or more tongue members connected to said flange unit for receiving one or more additional structural members; and
   c) pivot means connecting said one or more tongue members to said flange member, whereby said one or more tongue members may be oriented at different angles relative to said flange member.

16. The modular construction system of claim 15, further including:
   a first structural member operatively connected to the universal unit; and
   a base unit comprising four vertical walls extending from a horizontal base, for receiving said first structural member, said base unit including a plurality of holes for anchoring said base unit via suitable attachment means.

17. A modular construction system for connecting tow or more structural members, comprising:
   a) a universal unit for connection to a first structural member, said unit having at least one planar surface adapted to be oriented in substantially vertical orientation, support means projecting in substantially horizontal orientation from said planar surface, and a pair of finger members defining vertical channels on opposite sides of said support means;
   b) one or more connector units for removable connection to said universal unit, each of said connector units having a planar flange member adapted to be received in said vertical channels and to rest on said support means, and one or more tongue members connected to said flange unit for receiving one or more additional structural members;
   c) wherein said universal unit comprises four said planar surfaces arranged so as to form a rectangular sleeve adapted to fit over said first structural member, each of said four planar surfaces being provided with said finger members and said support means, whereby up to four said connector members may be connected to said universal member; and
   d) a plurality of holes in each said four planar surfaces for receiving fastening means by which said universal unit may be fastened to said first structural unit.

18. The modular construction system of claim 17, further including:
   a first structural member operatively connected to the universal unit; and
   a base unit comprising four vertical walls extending from a horizontal base, for receiving said first structural member, said base unit including a plurality of holes for anchoring said base unit via suitable attachment means.

19. A modular construction system for connecting two or more structural members, comprising:
   a) a universal unit for connection to a first structural member, said unit having at least one planar surface adapted to be oriented in substantially vertical orientation, support means projecting in substantially horizontal orientation from said planar surface, and a pair of finger members defining vertical channels on opposite sides of said support means;
   b) one or more connector units for removable connection to said universal unit, each of said connector units having a planar flange member adapted to be received in said vertical channels and to rest on said support means, and one or more tongue members connected to said flange unit for receiving one or more additional structural members; and
   c) a plurality of holes in said flange member for receiving fastening means by which said connector unit may be fastened to said universal unit.

20. The modular construction system of claim 19, further including:
   a first structural member operatively connected to the universal unit; and
   a base unit comprising four vertical walls extending from a horizontal base, for receiving said first structural member, said base unit including a plurality of holes for anchoring said base unit via suitable attachment means.

21. A modular construction system for connecting two or more structural members, comprising:
   a) a universal unit for connection to a first structural member, said unit having at least one planar surface adapted to be oriented in substantially vertical orientation, support means projecting in substantially horizontal orientation from said planar surface, and a pair of finger members defining vertical channels on opposite sides of said support means;
   b) one or more connector units for removable connection to said universal unit, each of said connector units having a planar flange member adapted to be received in said vertical channels and to rest on said support means, and one or more tongue members connected to said flange unit for receiving one or more additional structural members; and
   c) a plurality of holes in said one or more tongue members for receiving fastening means by which said tongue members may be fastened to said one or more additional structural members.

22. The modular construction system of claim 21, further including:
   a first structural member operatively connected to the universal unit; and
   a base unit comprising four vertical walls extending form a horizontal base, for receiving said first structural member, said base unit including a plurality of holes for anchoring said base unit via suitable attachment means.

* * * * *